(12) United States Patent
Takahashi (10) Patent No.: US 9,088,762 B2
(45) Date of Patent: Jul. 21, 2015

(54) IMAGE CAPTURING APPARATUS AND CONTROL METHOD THEREOF

(71) Applicant: CANON KABUSHIKI KAISHA, Tokyo (JP)

(72) Inventor: Ryo Takahashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 3 days.

(21) Appl. No.: 14/066,747

(22) Filed: Oct. 30, 2013

(65) Prior Publication Data

US 2014/0125830 A1    May 8, 2014

(30) Foreign Application Priority Data

Nov. 6, 2012    (JP) .................. 2012-244808

(51) Int. Cl.
| | | |
|---|---|---|
| H04N 5/225 | (2006.01) | |
| H04N 5/77 | (2006.01) | |
| H04N 5/232 | (2006.01) | |
| H04N 1/21 | (2006.01) | |
| H04N 101/00 | (2006.01) | |

(52) U.S. Cl.
CPC ............. *H04N 5/772* (2013.01); *H04N 1/2112* (2013.01); *H04N 5/2258* (2013.01); *H04N 5/23216* (2013.01); *H04N 5/23245* (2013.01); H04N 2101/00 (2013.01); H04N 2201/3247 (2013.01)

(58) Field of Classification Search
USPC .................................................. 348/207.99
See application file for complete search history.

(56) References Cited

U.S. PATENT DOCUMENTS

| 7,583,316 B2 * | 9/2009 | Miyashita et al. ............ 348/376 |
| 2005/0036044 A1 * | 2/2005 | Funakura ...................... 348/239 |
| 2012/0008011 A1 * | 1/2012 | Garcia Manchado ..... 348/231.2 |
| 2012/0120186 A1 * | 5/2012 | Diaz et al. ........................ 348/36 |
| 2012/0147204 A1 * | 6/2012 | Jeong et al. .............. 348/211.11 |
| 2013/0235224 A1 * | 9/2013 | Park et al. .................. 348/218.1 |

FOREIGN PATENT DOCUMENTS

JP    2005-094741 A    4/2005

\* cited by examiner

*Primary Examiner* — Anthony J Daniels
(74) *Attorney, Agent, or Firm* — Carter, DeLuca, Farrell & Schmidt, LLP (57) ABSTRACT

An image capturing apparatus comprises a first image capturing unit configured to shoot an object side; a second image capturing unit configured to shoot a photographer side; and a control unit configured to, in a shooting mode in which the first image capturing unit performs shooting and the second image capturing unit also performs shooting, when a setting upon shooting meets a predetermined condition, perform first recording processing of recording image data captured by the first image capturing unit and image data captured by the second image capturing unit in association with each other, and when the setting does not meet the predetermined condition, perform second recording processing of recording image data captured by the first image capturing unit without associating the image data with image data captured by the second image capturing unit.

12 Claims, 10 Drawing Sheets

IMAGE CAPTURING APPARATUS AND CONTROL METHOD THEREOF

BACKGROUND OF THE INVENTION

1. Field of the Invention

The present invention relates to an image capturing apparatus including a plurality of image capturing units.

2. Description of the Related Art

Recent mobile phones and smartphones include a camera (in-camera) for shooting a photographer himself/herself or an object on the photographer side in addition to a normal camera (out-camera) for shooting an object seen from the photographer. An electronic device incorporating such out-camera and in-camera has a simultaneous shooting function of performing shooting by simultaneously releasing the shutters of the out-camera and in-camera upon pressing a shutter button.

As for the simultaneous shooting function, Japanese Patent Laid-Open No. 2005-094741 describes a technique of recording, in association with each other, image data which have been shot by an in-camera and out-camera in a simultaneous shooting mode, respectively, and combining the image data of the in-camera with that of the out-camera.

The conventional technique described in Japanese Patent Laid-Open No. 2005-094741, however, assumes a case in which the user does not want to record image data shot by the in-camera in the simultaneous shooting mode, or a case in which the user does not want to combine the image data of the in-camera with that of the out-camera. In the former case, for example, when performing shooting using a self-timer, a photographer presses a shutter button, and then moves toward the out-camera side before the shutter is released, and therefore, it is unlikely that image data shot by the in-camera needs to be saved. Furthermore, when the photographer performs shooting while seeing through a viewfinder, image data obtained by shooting an object on the in-camera side is not worth saving, and recording the image data may often be in vain.

SUMMARY OF THE INVENTION

The present invention has been made in consideration of the aforementioned problems, and realizes a technique of automatically determining whether to record image data shot by an in-camera according to condition settings and the like upon shooting.

In order to solve the aforementioned problems, the present invention provides an image capturing apparatus comprising: a first image capturing unit configured to shoot an object side; a second image capturing unit configured to shoot a photographer side; and a control unit configured to, in a shooting mode in which the first image capturing unit performs shooting and the second image capturing unit also performs shooting, when a setting upon shooting meets a predetermined condition, perform first recording processing of recording image data captured by the first image capturing unit and image data captured by the second image capturing unit in association with each other, and when the setting does not meet the predetermined condition, perform second recording processing of recording image data captured by the first image capturing unit without associating the image data with image data captured by the second image capturing unit.

In order to solve the aforementioned problems, the present invention provides an image capturing apparatus comprising: a first image capturing unit configured to shoot an object side; a second image capturing unit configured to shoot a photographer side; and a control unit configured to, in a shooting mode in which the first image capturing unit performs shooting and the second image capturing unit also performs shooting, when a setting upon shooting meets a predetermined condition, perform first recording processing of recording image data captured by the first image capturing unit and image data captured by the second image capturing unit in association with each other, and when the setting does not meet the predetermined condition, perform second recording processing of recording image data captured by the first image capturing unit but not recording image data captured by the second image capturing unit.

In order to solve the aforementioned problems, the present invention provides an image capturing apparatus comprising: a first image capturing unit configured to shoot an object side; a second image capturing unit configured to shoot a photographer side; and a control unit configured to, in a shooting mode in which the first image capturing unit performs shooting and the second image capturing unit also performs shooting, when a setting upon shooting meets a predetermined condition, perform first recording processing of recording image data captured by the first image capturing unit and image data captured by the second image capturing unit in association with each other, and when the setting does not meet the predetermined condition, control to record image data captured by the first image capturing unit and not to perform image capturing by the second image capturing unit.

In order to solve the aforementioned problems, the present invention provides a control method of an image capturing apparatus having a first image capturing unit configured to shoot an object side and a second image capturing unit configured to shoot a photographer side, the method comprising: a control step of, in a shooting mode in which the first image capturing unit performs shooting and the second image capturing unit also performs shooting, when a setting upon shooting meets a predetermined condition, performing first recording processing of recording image data captured by the first image capturing unit and image data captured by the second image capturing unit in association with each other, and when the setting does not meet the predetermined condition, performing second recording processing of recording image data captured by the first image capturing unit without associating the image data with image data captured by the second image capturing unit.

In order to solve the aforementioned problems, the present invention provides a control method of an image capturing apparatus having a first image capturing unit configured to shoot an object side and a second image capturing unit configured to shoot a photographer side, the method comprising: a control step of, in a shooting mode in which the first image capturing unit performs shooting and the second image capturing unit also performs shooting, when a setting upon shooting meets a predetermined condition, performing first recording processing of recording image data captured by the first image capturing unit and image data captured by the second image capturing unit in association with each other, and when the setting does not meet the predetermined condition, performing second recording processing of recording image data captured by the first image capturing unit but not recording image data captured by the second image capturing unit.

In order to solve the aforementioned problems, the present invention provides a control method of an image capturing apparatus having a first image capturing unit configured to shoot an object side and a second image capturing unit configured to shoot a photographer side, the method comprising: a control step of, in a shooting mode in which the first image capturing unit performs shooting and the second image capturing unit also performs shooting, when a setting upon shooting meets a predetermined condition, performing first recording processing of recording image data captured by the first image capturing unit and image data captured by the second image capturing unit in association with each other, and when the setting does not meet the predetermined condition, controlling to record image data captured by the first image capturing unit and not to perform image capturing by the second image capturing unit.

According to the present invention, it is possible to automatically determine whether to record image data shot by an in-camera according to condition settings and the like upon shooting, and prevent unnecessary image data from being recorded, thereby saving a memory capacity, and shortening the time taken for recording processing.

Further features of the present invention will become apparent from the following description of exemplary embodiments (with reference to the attached drawings).

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

Embodiments upon application of the present invention to an image capturing apparatus such as a digital camera for shooting a still image and/or moving image will be described in detail hereinafter with reference to the drawings.

<Apparatus Configuration> The configuration and functions of an image capturing apparatus according to this embodiment of the present invention will be described below with reference to FIG. 1.

Figure 1:
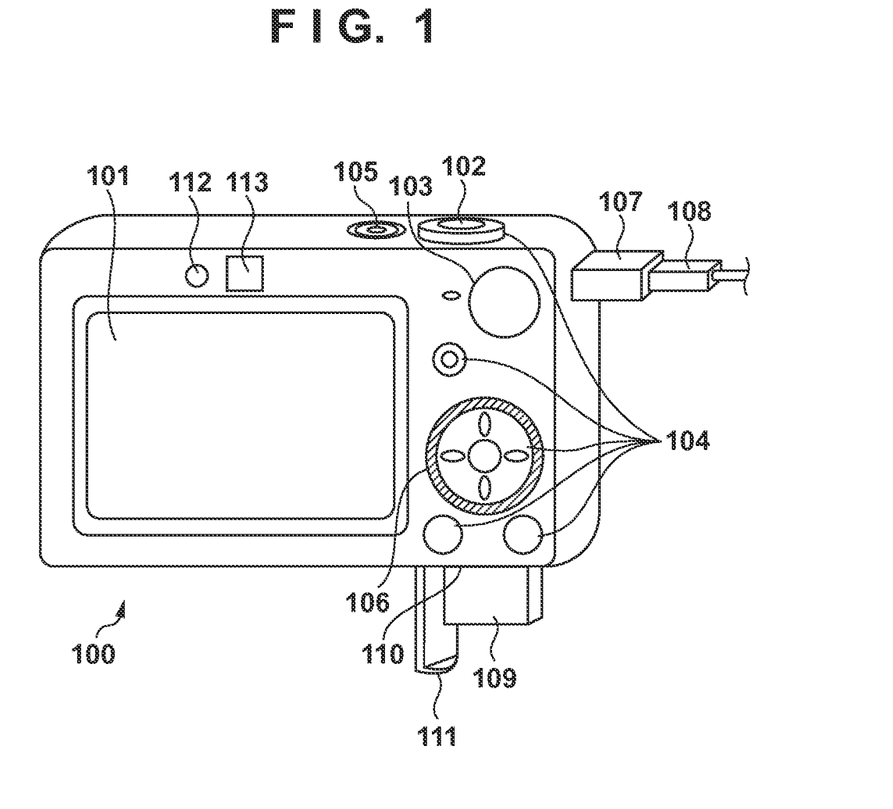
FIG. 1 a view showing the outer appearance of an image capturing apparatus according to an embodiment of the present invention.

In FIG. 1, a display unit 101 is a display device such as an LCD panel which displays images and various information. A shooting button 102 is an operation unit for a shooting instruction. A mode switching button 103 is an operation unit for changing over among various modes. A connector 107 is an interface that connects a connection cable 108 with a digital camera 100. Operation units 104 comprise operation members such as various switches, buttons and a touch panel operated in various ways by the user. A controller wheel 106 is a rotatable operation member included among the operation units 104. A power switch 105 switches between power on and power off. A recording medium 109 is a medium such as a memory card or hard disk. A recording medium slot 110 is for accommodating the recording medium 109. The recording medium 109 accommodated in the recording medium slot 110 makes it possible to communicate with the digital camera 100. A cover 111 covers the recording medium slot 110. An in-camera 112 is a camera module for shooting a photographer himself/herself or an object on the photographer side. A viewfinder 113 is provided for the photographer to shoot an object while seeing through the viewfinder, and includes an eye detection unit for detecting whether the photographer's eye is in contact with the viewfinder 113.

Figure 2:
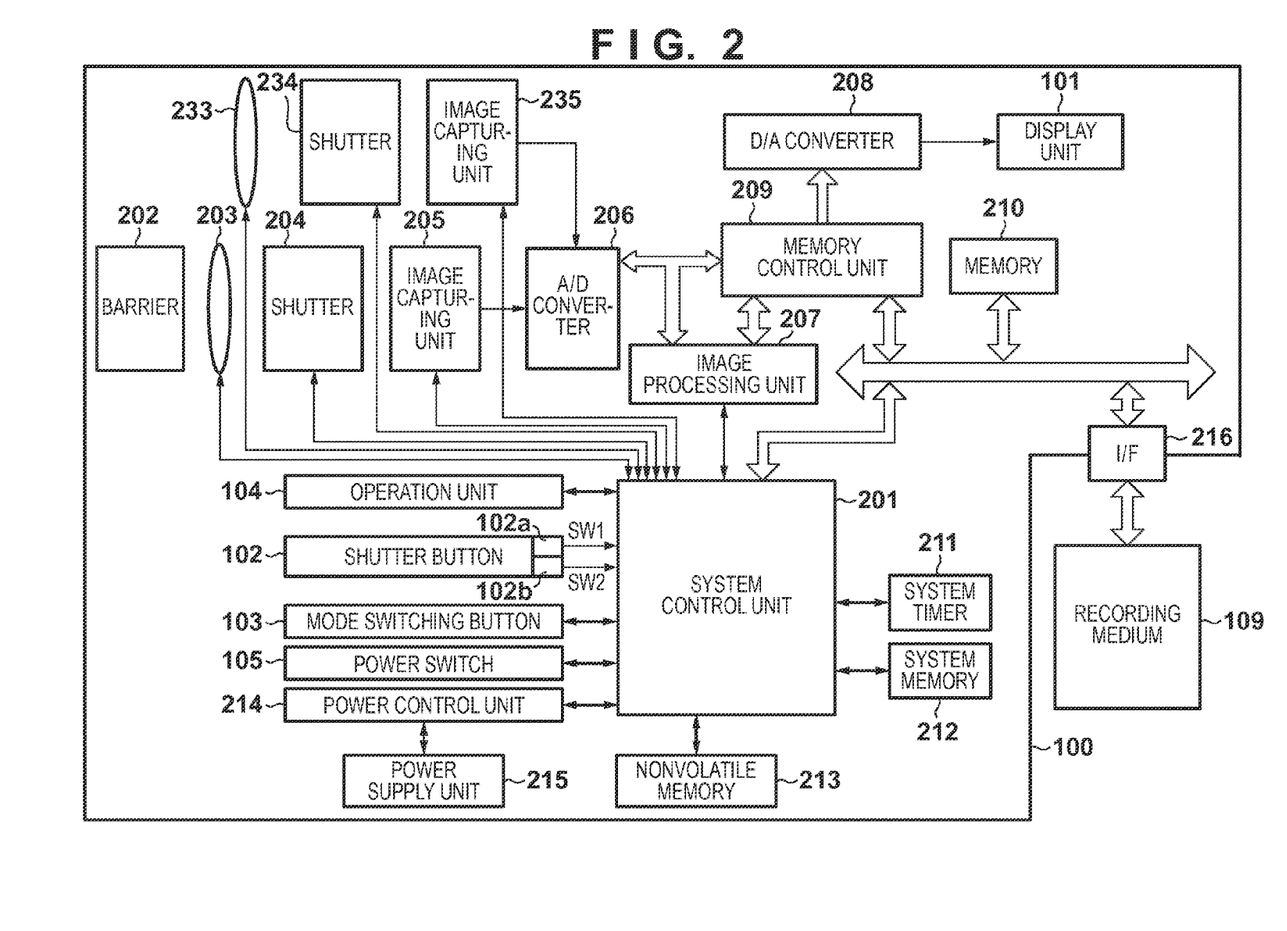
FIG. 2 is a block diagram showing the configuration of the image capturing apparatus according to the embodiment.

FIG. 2 is a block diagram exemplifying the configuration of the digital camera 100 according to this embodiment.

Referring to FIG. 2, the digital camera 100 according to this embodiment includes an out-camera module (to be referred to as an out-camera hereinafter) for shooting an object seen from the photographer, and an in-camera module (to be referred to as an in-camera hereinafter) for shooting the photographer himself/herself or an object on the photographer side. The out-camera includes a first imaging optical system formed by a photographing lens 203, a shutter 204, and an image capturing unit 205. The in-camera includes a second imaging optical system formed by a photographing lens 233, a shutter 234, and an image capturing unit 235.

Each of photographing lenses 203, 233 includes a zoom lens and a focusing lens. Each of shutters 204, 234 has a diaphragm function. Each of image capturing units 205, 235 is an image sensor, which is constituted by a CCD or CMOS or the like, for converting the optical image of a subject to an electric signal.

An A/D converter 206 converts analog signals, each of which is output from the image capturing units 205, 235, to a digital signal. A barrier 202 covers the image capturing system which includes the photographing lens 203 of the part of the out-camera of the digital camera 100, thereby preventing contamination of and damage to the image capturing system that includes the photographing lens 203, shutter 204 and image capturing unit 205.

An image processing unit 207 performs resizing processing, such as predetermined pixel interpolation and reduction, and color conversion processing, with respect to data from the A/D converter 206 or data from a memory control unit 209. Further, the image processing unit 207 performs predetermined calculation processing using the captured image data, and the system control unit 201 performs exposure control and distance measuring control based on the calculation results. Thus, AF (Automatic Focus) processing, AE (Automatic Exposure) processing, and EF (flash pre-emission) processing of TTL (Through the Lens) type are performed. Furthermore, the image processing unit 207 performs predetermined calculation processing using the captured image data, and AWB (Automatic White Balance) processing of TTL type is performed on the basis of the calculation results.

Note that the A/D converter 206 and image processing unit 207 can be provided in each of the image capturing units 205 and 235.

The data from the A/D converter 206 is directly written into a memory 210 via both the image processing unit 207 and the memory control unit 209 or via the memory control unit 207. The memory 210 stores the image data obtained from the image capturing unit 205 and the A/D converter 206, and image display data to be displayed on the display unit 101. The memory 210 has a storage capacity that is sufficient for storing a predetermined number of still images as well as moving images and audio for a predetermined time period.

The memory 210 also functions as a memory for image display (video memory). A D/A converter 208 converts the image display data stored in the memory 210 into an analog signal and applies the display unit 101 with the analog signal. The image display data that was written into the memory 210 is displayed by the display unit 101 via the D/A converter 208. The display unit 101 performs, on a display device such as an LCD, display in accordance with the analog signal from the D/A converter 208. The digital signal once converted by the A/D converter 206 and stored in the memory 210 are converted into analog signals by the D/A converter 208, and the analog signals are successively transmitted to the display unit 101 so as to be displayed thereon, making it possible to realize an electronic view finder (EVF) functionality and to perform through image display (live view display).

A nonvolatile memory 213 is, for example, an EEPROM, which is electrically erasable and recordable. In the nonvolatile memory 213, constants and programs, for example, for operating the system control unit 201 are stored. In this context, "programs" may refer to programs for executing various flowcharts that will be described later.

The system control unit 201 is a calculation processing device for overall controlling the entire camera 100, and realizes, by executing the programs stored in the nonvolatile memory 213, the procedures of the flowchart that will be described later. The system memory 212 is, for example, a RAM and used also as a work memory where constants and variables for operating the system control unit 201, and the programs read out from the nonvolatile memory 213 are expanded. The system control unit 201 controls the memory 210, the D/A converter 208, the display unit 101, and the like, so as to perform display control.

A system timer 211 is a timer circuit for measuring time periods for various types of controls and the time of an integrated clock.

A mode switching button 103, a first shutter switch 102a, a second shutter switch 102b, and the operation units 104 are operation members for inputting various types of instructions into the system control unit 201.

The mode switching button 103 switches the operation mode of the system control unit 201 to any of a still image recording mode, a moving image recording mode, and a reproduction mode. The still image recording mode includes an automatic shooting mode, an automatic scene determination mode, a manual mode, various types of scene modes in which different settings are configured for individual shooting scenes, a program AE mode, a custom mode, a simultaneous shooting mode in which the out-camera and in-camera can simultaneously perform shooting, and the like. Using the mode switching button 103, the mode is directly switched to any of the plurality of modes included in the still image recording mode. Alternatively, it is also possible to switch, using the mode switching button 103, to the still image recording mode and then to switch, using another operation member, to any of the plurality of modes included in the still image recording mode. Similarly, also the moving image recording mode may include a plurality of modes.

While the shutter button 102 provided on the camera 100 is being operated, that is, pressed half-way (the shooting preparation instruction), the first shutter switch 102a is turned on and generates a first shutter switch signal SW1. Upon receiving the first shutter switch signal SW1, the system control unit 201 causes the image processing unit 207 to start the AF (Automatic Focus) processing, the AE (Automatic Exposure) processing, the AWB (Automatic White Balance) processing, the EF (flash pre-emission) processing and the like.

When the operation of the shutter button 102 is completed, that is, the shutter button 102 is pressed fully (the shooting instruction), the second shutter switch 102b is turned on and generates a second shutter switch signal SW2. Upon receiving the second shutter switch signal SW2, the system control unit 201 starts a series of shooting processing from reading out the signal from each of the image capturing units 205, 235 to writing of image data to the recording medium 109.

By selecting various functional icons displayed on the display unit 101, appropriate functions for each situation are assigned to the operation units 104, and the operation units 104 thus act as various function buttons. Examples of these function buttons include an end button, a back button, an image scrolling button, a jump button, a narrow-down button, an attribute change button. For example, a notification for a menu switching instruction is given and a menu screen that enables various settings to be made is displayed on the display unit 101 by pressing a menu button. The user can make various settings intuitively by using the menu screen, which is displayed on the display unit 101, four-direction (up, down, left, right) buttons and a SET button.

The controller wheel 106, which is a rotatable operation member included among the operation units 104, is used together with the direction buttons as when a selection item is specified. When the controller wheel 106 is turned, an electrical pulse signal is generated in accordance with the amount of rotation, and the system control unit 201 controls each unit of the digital camera 100 based upon the pulse signal. The angle through which the controller wheel 106 has been turned and how many times it has been turned can be determined by the pulse signal. It should be noted that the controller wheel 106 can be any operating member so long as it is an operating member whose rotation can be detected. For example, it can be a dial operating member in which the controller wheel 106 per se is rotated to generate the pulse signal in accordance with a turning operation by the user. Further, it can be a device (a so-called touch wheel) that detects an operation such as the revolution of the user's finger on the controller wheel 106 without by controller wheel 106 itself being rotated.

A power control unit 214 is constituted by, for example, a battery detection circuit, a DC-DC converter, a switch circuit for changing over the block to be supplied with power, and detects a battery has been inserted or not, the type of the battery, and the residual capacity thereof. Further, the power control unit 214 controls the DC-DC converter in accordance with the detection results and an instruction of the system control unit 201, and supplies a necessary voltage for a necessary length of time to each of the units including the recording medium 109.

A power supply unit 215 comprises a primary battery such as an alkaline battery or a lithium battery, a secondary battery such as an NiCd battery, an NiMH battery, or an Li battery, or an AC adaptor. The recording medium interface (I/F) 216 is for interfacing with the recording medium 109 such as the memory card or hard disk. The recording medium 109 is a recording medium such as a memory card for recording shot images, and constituted by a semiconductor memory, a magnetic disk, or the like.

Included among the operation units 104 is also a touch panel as a touch detecting unit capable of detecting a touch operation on the display unit 101. The touch panel and the display unit 101 can be constructed as a single integrated unit. For example, the touch panel is constructed in such a manner that the transmittance of light will not interfere with the display presented by the display unit 101, and it is attached to the uppermost layer of the display face of the display unit 101. In addition, input coordinates on the touch panel and display coordinates on the display unit 101 are correlated. As a result, a GUI can be constructed that makes it possible for the user to directly manipulate the screen displayed on the display unit 101.

The system control unit 201 is capable of detecting the following operations performed by contacting the touch panel 213: touching of the panel using a finger or pen (referred to as "touch-down" below); a state in which the touch panel is in contact with a finger or pen (referred to as "touch-on" below); movement of a finger or pen while in contact with the touch panel (referred to as "move" below); lifting of a finger or pen that has been in contact with the touch panel (referred to as "touch-up" below); and a state in which the touch panel is not being touched at all (referred to as "touch-off" below). These operations and position coordinates at which the touch panel is being touched by the finger or pen are communicated to the system control unit 201 through an internal bus and, based upon the information thus communicated, the system control unit 201 determines what kind of operation was performed on the touch panel. As for "move", the determination can be made also for every vertical component and horizontal component with regard to the direction of movement of the finger or pen, which is moved on the touch panel, based upon a change in the coordinate position. Further, it is assumed that a stroke has been made when "touch-up" is performed following a regular "move" after a "touch-down" on the touch panel. A very quick stroke action is referred to as a "flick". A "flick" is an operation in which, with fingers in contact with the touch panel, the fingers are moved rapidly over a certain distance and then lifted. In other words, this is a rapid tracing operation in which the fingers are flicked across the surface of the touch panel. The system control unit 201 can determine that a "flick" has been performed when it detects such movement over a predetermined distance or greater and at a predetermined speed or greater and then detects "touch-up". Further, the system control unit 201 can determine that "drag" has been performed if it detects movement over a predetermined distance or greater at a speed less than a predetermined speed. It should be noted that the touch panel may employ a method that relies upon any of the following: resistive film, electrostatic capacitance, surface acoustic waves, infrared radiation, electromagnetic induction, image recognition and optical sensing.

<Basic Operation> The basic operation of the digital camera 100 according to this embodiment from the start to the end will be described with reference to FIG. 3. Note that processing shown in FIG. 3 is implemented when a program recorded in the nonvolatile memory 213 is read out into the system memory 212, and executed by the system control unit 201.

Figure 3:
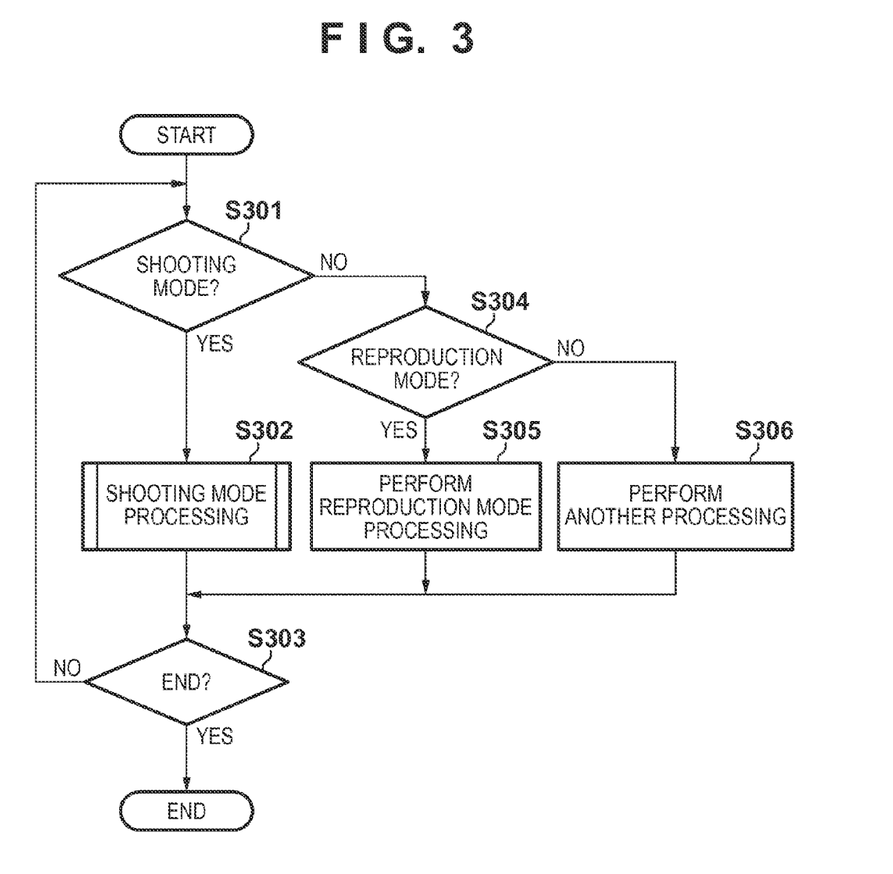
FIG. 3 is a flowchart illustrating the basic operation of the image capturing apparatus according to the embodiment.

Upon turning on the power switch 105 of the digital camera 100, the processing shown in FIG. 3 starts.

In step S301, the system control unit 201 determines whether the position of the mode switching button 103 indicates a shooting mode. If it is determined that the position of the mode switching button 103 indicates the shooting mode, the process advances to step S302 to execute shooting mode processing; otherwise, the process advances to step S304. The shooting mode processing will be described later in the first and second embodiments.

In step S304, the system control unit 201 determines whether the position of the mode switching button 103 indicates the reproduction mode. If it is determined that the position of the mode switching button 103 indicates the reproduction mode, the process advances to step S305 to execute reproduction mode processing; otherwise, the process advances to step S306 to execute another processing. The reproduction mode processing includes image viewing processing, image enlargement display processing, and image delete processing. The other processing includes processing in a clock display mode in which only the current time is displayed.

Upon completion of each mode processing, the process advances to step S303 and the system control unit 201 determines whether to shut down the camera. If it is determined to shut down the camera, the operation is terminated; otherwise, the process returns to step S301.

<Shooting Mode Processing> The shooting mode processing in step S302 of FIG. 3 will be described with reference to FIG. 4.

Figure 4:
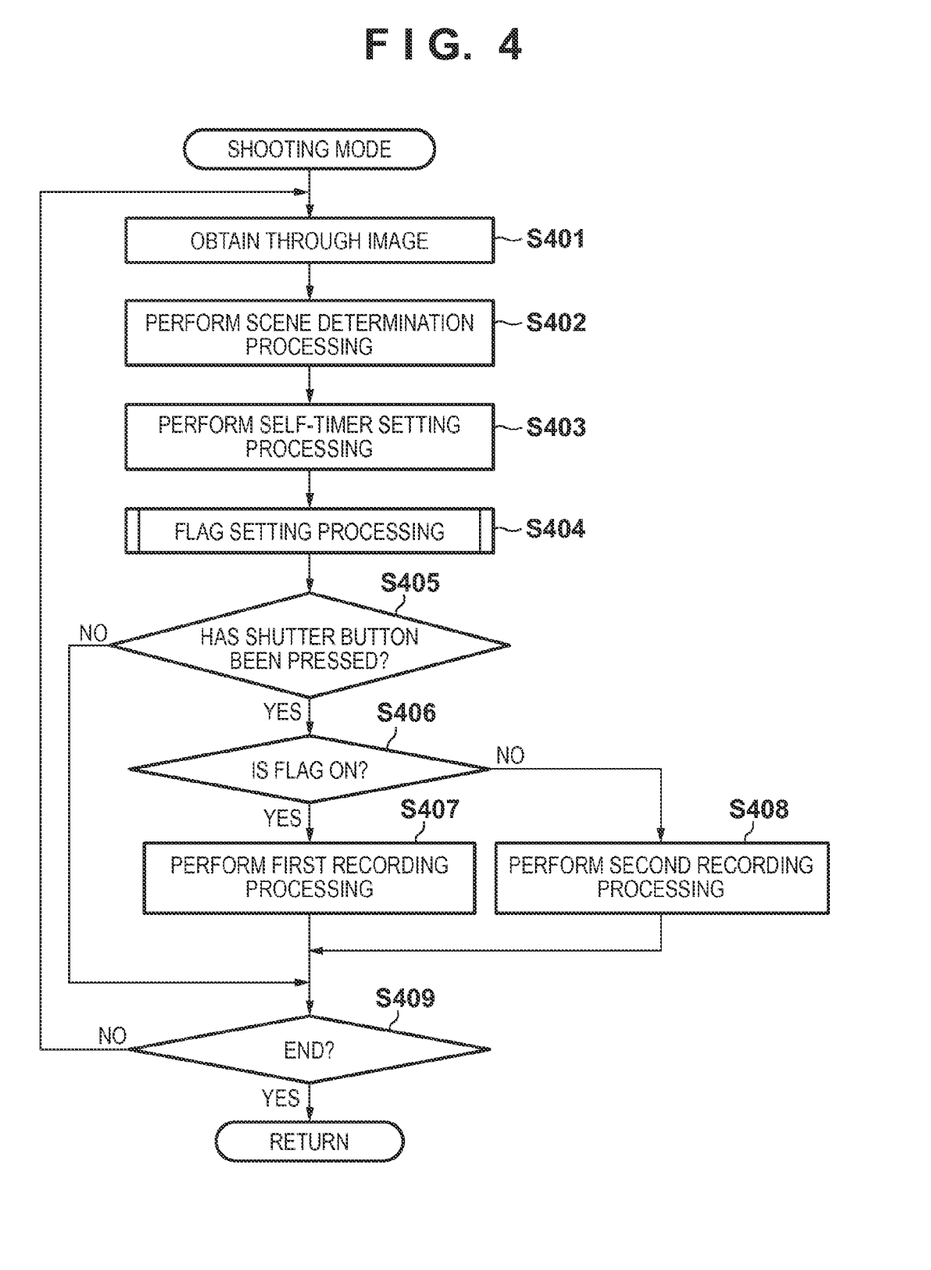
FIG. 4 is a flowchart illustrating the operation of the image capturing apparatus in a shooting mode according to the embodiment.

Referring to FIG. 4, in step S401, the system control unit 201 displays a through image on the display unit 101.

In step S402, the system control unit 201 determines an object scene. If, as a determination result, the through image includes the face of a person, the system control unit 201 automatically changes exposure to obtain the correct exposure of the face of a main object. If a night view scene is determined, the system control unit 201 controls to set a high ISO sensitivity. Furthermore, it is possible to determine whether shooting is performed using a tripod or whether motion of the object is included.

In step S403, the system control unit 201 performs self-timer setting processing. In this example, the user can set, through a setting screen, a predetermined time from when the user fully presses the shutter button 102 until the shutter button is released. The default value is 0 sec. It is also possible to change the default value when the user wants to use the self-timer, or change the number of images to be shot.

In step S404, the system control unit 201 performs processing (flag setting processing) of setting a flag to ON when a predetermined condition (to be described later) is met.

In step S405, the system control unit 201 determines whether the shutter button 102 has been fully pressed. If it is determined that the shutter button has been pressed, the process advances to step S406; otherwise, the process advances to step S409.

In step S406, the system control unit 201 determines whether the flag is ON. If the flag is ON, the process advances to step S407; otherwise, the process advances to step S408.

In step S407, the system control unit 201 performs first recording processing since the flag is ON. In the first recording processing, image data (to be also referred to as an out-camera image hereinafter) shot by the out-camera and image data (to be also referred to as an in-camera image hereinafter) shot by the in-camera are held in the memory 210, metadata for associating these image data with each other is embedded in each of them, and the thus obtained image data are recorded in the recording medium 109.

In step S408, the system control unit 201 performs second recording processing since the flag is OFF. In the second recording processing, out-camera image data and in-camera image data are held in the memory 210, and are recorded in the recording medium 109 without embedding metadata for associating them with each other. The associated metadata is referred to when simultaneously displaying the out-camera image data and in-camera image data on the display unit 101 in displaying the image data in the reproduction mode.

In step S409, the system control unit 201 determines whether to end the shooting mode. If it is determined to end the shooting mode, the system control unit 201 ends the shooting mode; otherwise, the process returns to step S401.

Like the above-described first recording processing and second recording processing, when the predetermined condition is met, the out-camera image data and in-camera image data are associated with each other, and when the predetermined condition is not met, these image data are not associated with each other, thereby preventing unnecessary metadata from being embedded. This results in a decrease in processing time for embedding metadata. It is also possible to prevent unintended in-camera image data from being displayed in association with the out-camera image data at the time of image reproduction.

<Flag Setting Processing 1> Flag setting processing 1 in step S404 of FIG. 4 will be described with reference to FIG. 5A.

Figure 5A:
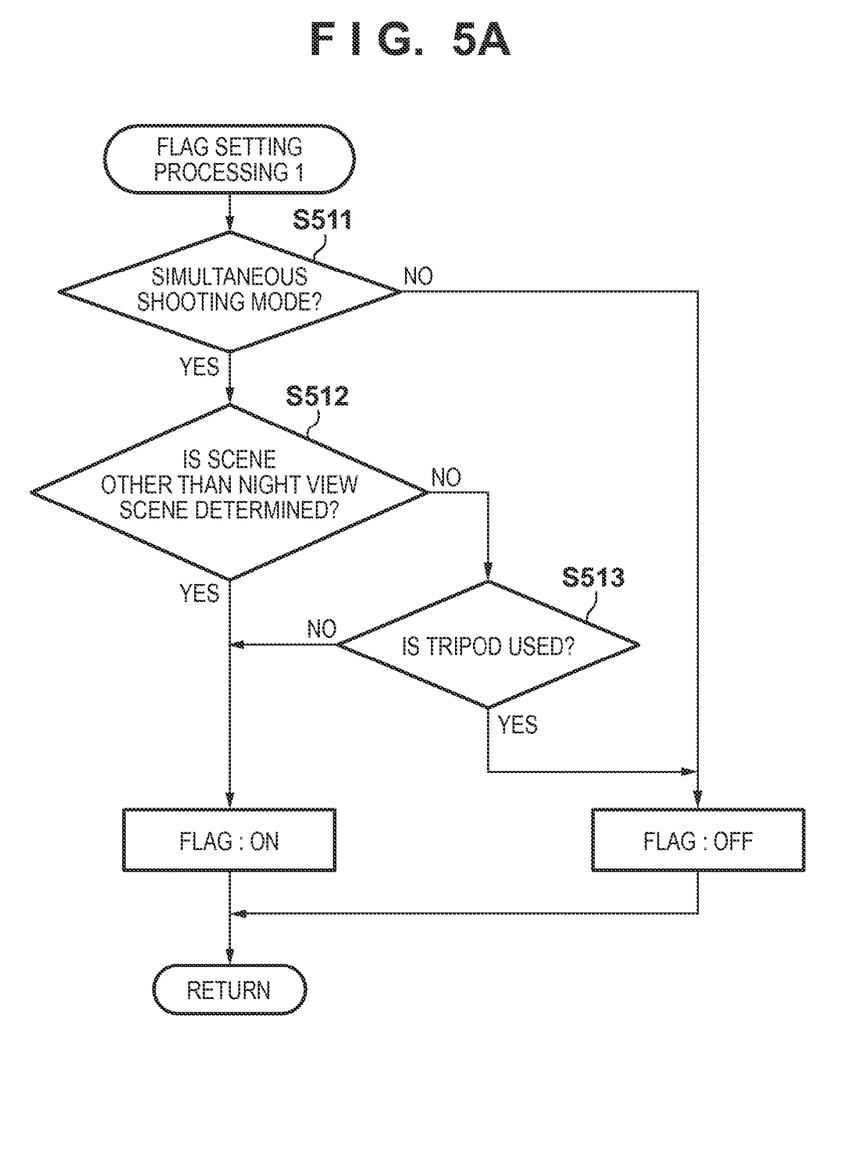
FIG. 5A is a flowchart illustrating flag setting processing 1 in step S404 of FIG. 4.

Referring to FIG. 5A, in step S511, the system control unit 201 determines whether the current shooting mode is the simultaneous shooting mode. If the current shooting mode is the simultaneous shooting mode, the process advances to step S512; otherwise, the flag is set to OFF and the process is terminated.

In step S512, the system control unit 201 determines whether a scene other than a night view scene is determined as a result of the scene determination processing in step S402. If a scene other than a night view scene is determined, the flag is set to ON and the process is terminated. Alternatively, if a night view scene is determined, the process advances to step S513.

In step S513, the system control unit 201 determines whether the scene is a night view scene and shooting is performed using a tripod. If a night view scene is determined and shooting is performed without using a tripod, the flag is set to ON; otherwise, the flag is set to OFF. The process is then terminated.

As described above, if the scene is not a night view scene, an error image is hardly generated even if an object exists on the in-camera side. It is, therefore, desirable to set the flag to ON and perform the first recording processing in step S407. If, for example, the scene is a night view scene and shooting is performed using a tripod, no object may exist on the in-camera side, and thus it is desirable to perform the second recording processing in step S408. As described above, avoiding unnecessary image association contributes to saving the memory, and the like.

<Flag Setting Processing 2> Flag setting processing 2 in step S404 of FIG. 4 will be described with reference to FIG. 5B.

Figure 5B:
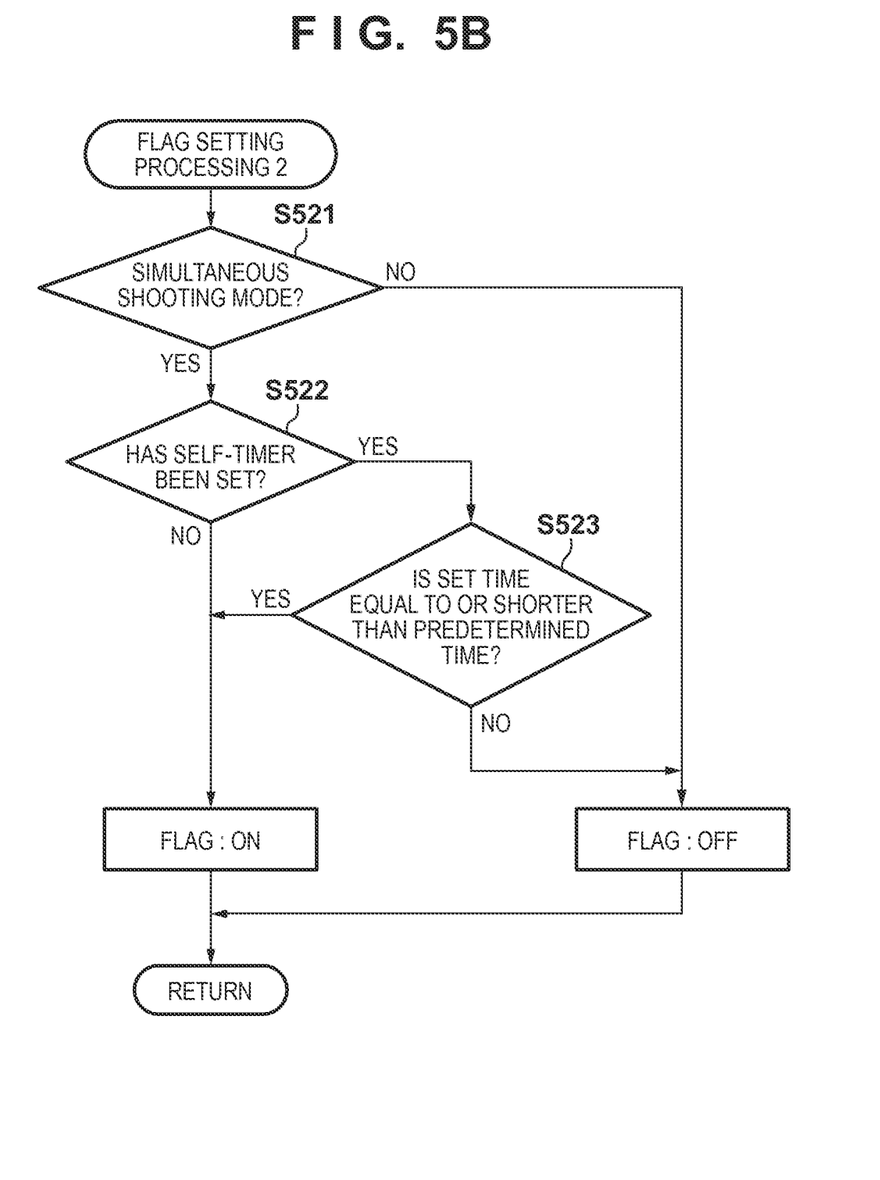
FIG. 5B is a flowchart illustrating flag setting processing 2 in step S404 of FIG. 4.

Referring to FIG. 5B, in step 3521, the system control unit 201 determines whether the current shooting mode is the simultaneous shooting mode. If the current shooting mode is the simultaneous shooting mode, the process advances to step S522; otherwise, the flag is set to OFF and the process is terminated.

In step S522, the system control unit 201 determines whether the self-timer has been set in step S403 of FIG. 4. If the self-timer has not been set, the flag is set to ON and the process is terminated; otherwise, the process advances to step S523.

In step 3523, the system control unit 201 determines whether the set time of the self-timer is equal to or shorter than a predetermined time (for example, 2 sec). If the set time is longer than the predetermined time, the flag is set to OFF and the process is terminated; otherwise, the flag is set to ON and the process is terminated.

As described above, if the self-timer has not been set, an object highly likely exists on the in-camera side, and it is thus desirable to set the flag to ON and perform the first recording processing in step S407. If the self-timer has been set but a short time such as 2 sec has been set, this setting may have been made for camera shake prevention shooting. In this case, it is desirable to set the flag to ON and perform the first recording processing in step S407. On the other hand, if the set time of the self-timer is long (for example, 10 sec), the photographer may have moved to an object on the out-camera side after pressing the shutter button. In this case, an unintended image may remain on the in-camera side, and association and recording of such image waste the memory and processing time. It is, therefore, desirable to perform the second recording processing in step S408. This contributes to saving the memory and processing time.

<Flag Setting Processing 3> Flag setting processing 3 in step S404 of FIG. 4 will be described with reference to FIG. 5C.

Figure 5C:
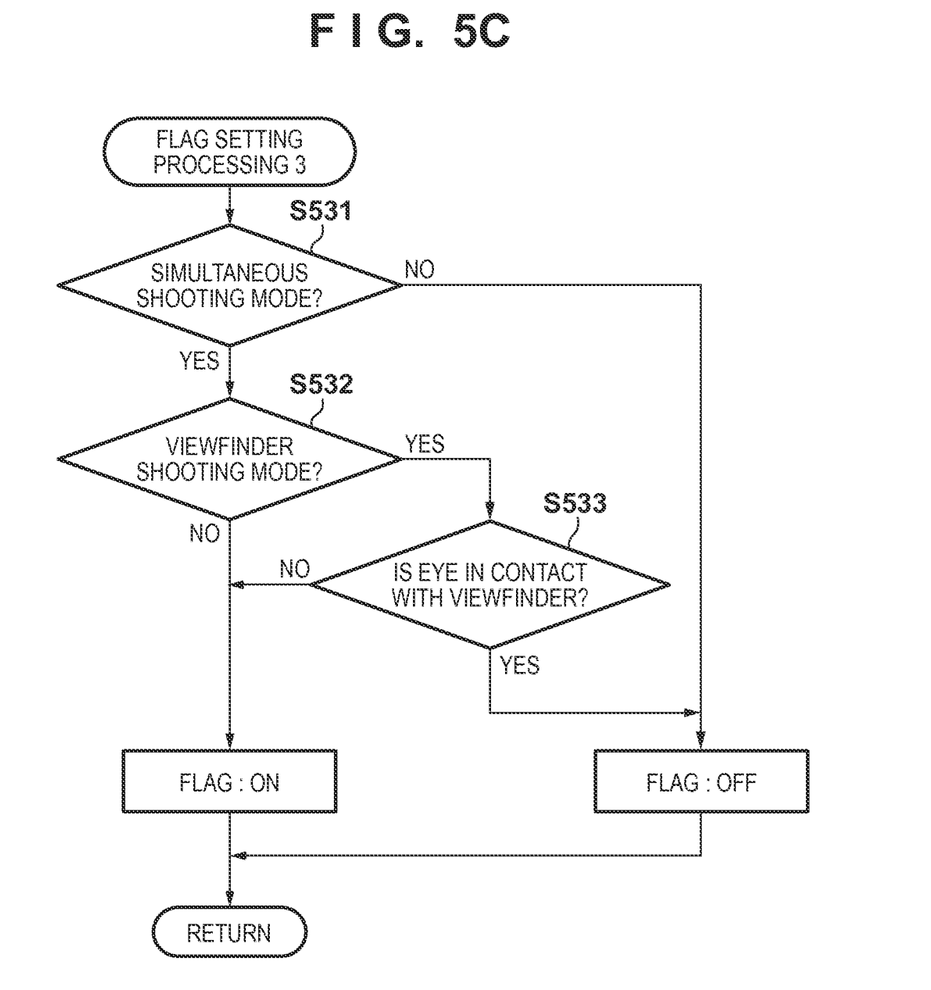
FIG. 5C is a flowchart illustrating flag setting processing 3 in step S404 of FIG. 4.

Referring to FIG. 5C, in step S531, the system control unit 201 determines whether the current shooting mode is the simultaneous shooting mode. If the current shooting mode is the simultaneous shooting mode, the process advances to step S522; otherwise, the flag is set to OFF and the process is terminated.

In step S532, the system control unit 201 determines whether a viewfinder shooting mode has been set. If it is determined that the viewfinder shooting mode has not been set, the flag is set to ON and the process is terminated; otherwise, the process advances to step S533.

In step S533, the system control unit 201 determines using the eye detection unit whether an eye is in contact with the viewfinder 113. If it is determined that no eye is in contact with the viewfinder 113, the flag is set to ON and the process is terminated; otherwise, the flag is set to OFF and the process is terminated. Note that it may be possible to switch between the viewfinder shooting mode and the electronic viewfinder shooting mode upon press of a given button of the operation units 104. As described above, if the viewfinder shooting mode has been set, shooting is highly likely performed while seeing through the viewfinder, and thus shooting by the in-camera results in an error image at a high possibility. To the contrary, if the viewfinder shooting mode has not been set, an image shot by the in-camera highly likely includes the face of the photographer, and it is thus desirable to set the flag to ON and perform the first recording processing in step S407. Furthermore, if the contact of an eye has not been detected even though the viewfinder shooting mode has been set, an image shot by the in-camera highly likely includes the face of the photographer, and it is thus desirable to set the flag to ON and perform the first recording processing in step S407. Note that the process may directly advance from step S531 to step S533 by omitting the processing in step S532, and it may be determined whether to set the flag to ON depending on whether the contact of an eye has been detected. If the contact of an eye has been detected, shooting by the in-camera results in an error image at a high possibility. Therefore, performing only the determination processing in step S533 also contributes to reducing unnecessary memory consumption and processing time.

<Flag Setting Processing 4> Flag setting processing 4 in step S404 of FIG. 4 will be described with reference to FIG. 5D.

Figure 5D:
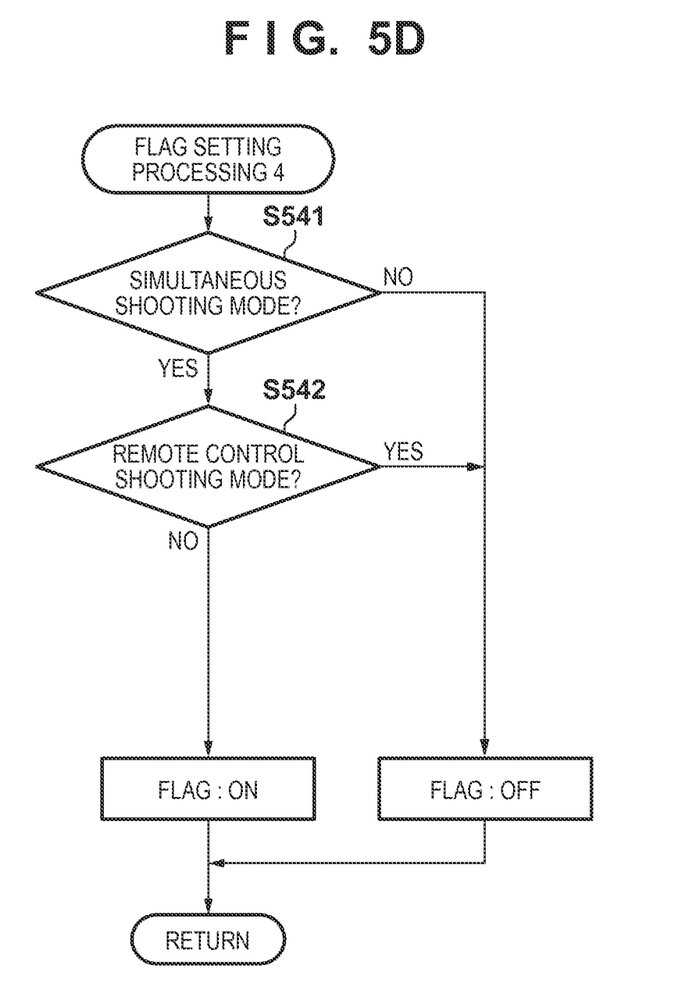
FIG. 5D is a flowchart illustrating flag setting processing 4 in step S404 of FIG. 4.

Referring to FIG. 5D, in step S541, the system control unit 201 determines whether the current shooting mode is the simultaneous shooting mode. If the current shooting mode is the simultaneous shooting mode, the process advances to step S542; otherwise, the flag is set to OFF and the process is terminated.

In step S542, the system control unit 201 determines whether a remote control shooting mode (shooting is externally performed by a remote operation) has been set. If the remote control shooting mode has not been set, the flag is set to ON and the process is terminated; otherwise, the flag is set to OFF and the process is terminated.

As described above, since the photographer may not exist on the in-camera side in the remote control shooting mode, it is desirable to perform the second recording processing in step S408. This contributes to reducing unnecessary memory consumption and processing time.

<Flag Setting Processing 5> Flag setting processing 5 in step S404 of FIG. 4 will be described with reference to FIG. 6.

Processing obtained by combining one or some of the processes in steps S512, S513, S522, S523, S532, S533, and S542 with the process in steps S511 to S541 of FIGS. 5A to 5D will now be explained.

Figure 6:
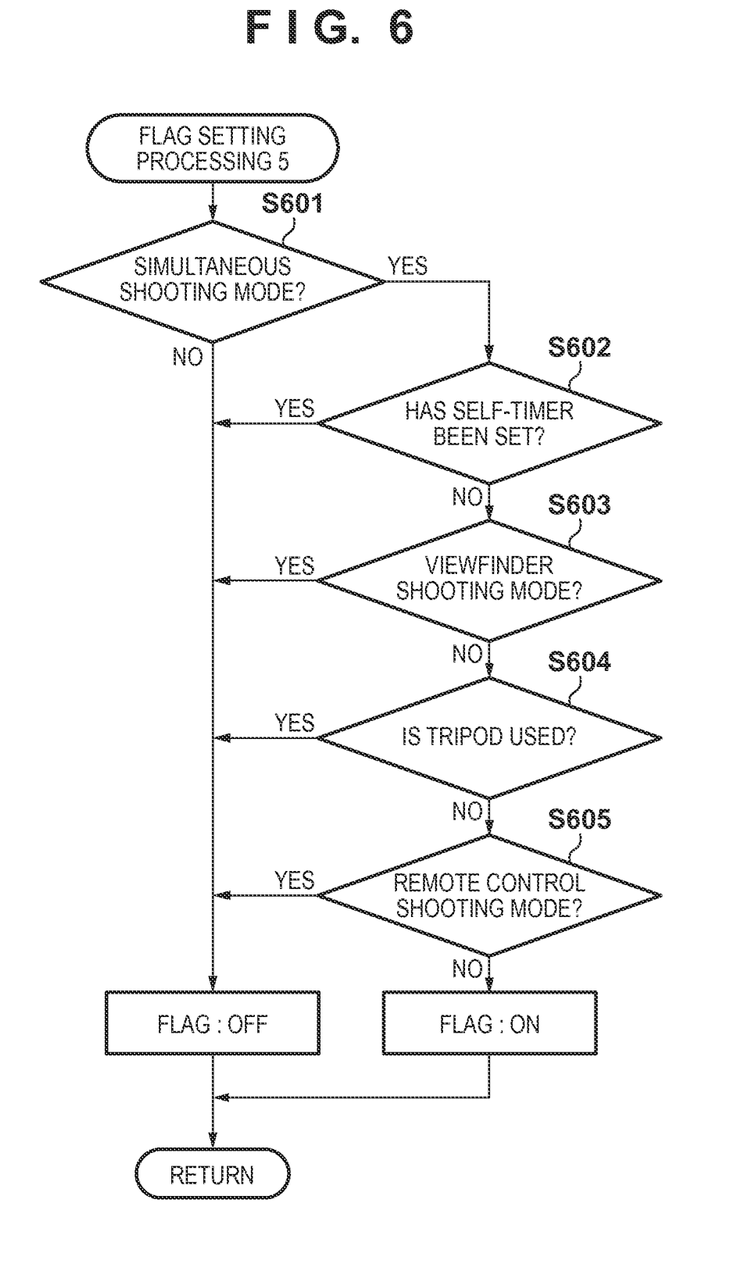
FIG. 6 is a flowchart illustrating flag setting processing 5 in step S404 of FIG. 4.

Referring to FIG. 6, in step S601, the system control unit 201 determines whether the current shooting mode is the simultaneous shooting mode. If the current shooting mode is the simultaneous shooting mode, the process advances to step S602; otherwise, the flag is set to OFF and the process is terminated.

In step S602, the system control unit 201 determines whether the self-timer has been set. If the self-timer has been set, the flag is set to OFF; otherwise, the process advances to step S603.

In step S603, the system control unit 201 determines whether the viewfinder shooting mode has been set. If the viewfinder shooting mode has been set, the flag is set to OFF and the process is terminated; otherwise, the process advances to step S604.

In step S604, the system control unit 201 determines whether shooting is performed using a tripod. If shooting is performed using a tripod, the flag is set to OFF; otherwise, the process advances to step S605.

In step S605, the system control unit 201 determines whether the remote control shooting mode has been set. If the remote control shooting mode has been set, the flag is set to OFF and the process is terminated; otherwise, the flag is set to ON and the process is terminated.

As described above, combining the flag setting processes 1 to 4 as needed also contributes to reducing unnecessary memory consumption and processing time.

Second Embodiment

Figure 7:
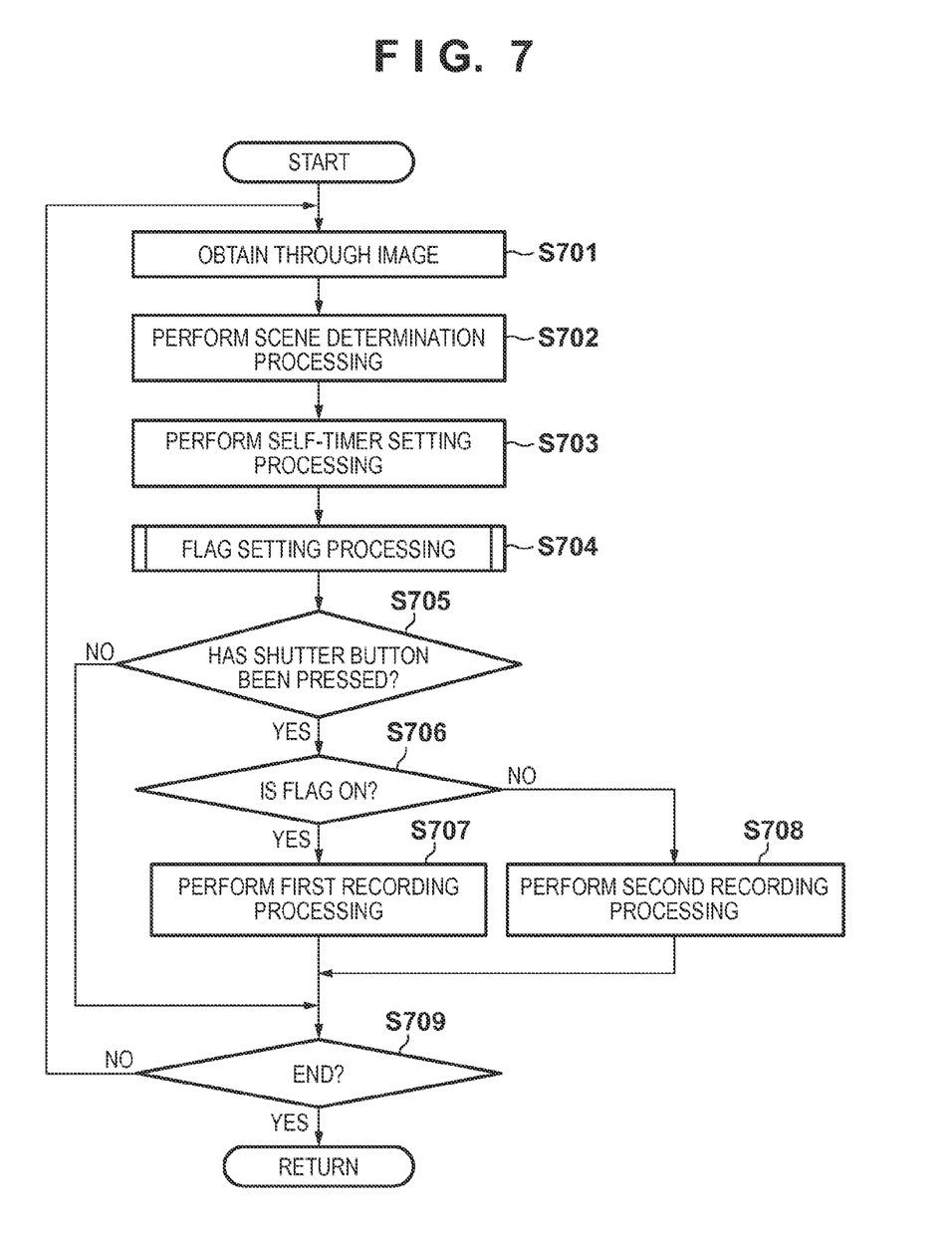
FIG. 7 is a flowchart illustrating an operation in a shooting mode according to the second embodiment.

Shooting mode processing according to the second embodiment will be described with reference to FIG. 7. Note that processes in steps S701 to S706 and S709 of FIG. 7 are the same as those in steps S401 to S406 and S409 of FIG. 4, respectively, and a description thereof will be omitted.

In step S707, a system control unit 201 performs first recording processing since a flag is ON. In the first recording processing, out-camera image data and in-camera image data are held in a memory 210, metadata for associating these image data with each other is embedded in each of them, and the thus obtained image data are recorded in a recording medium 109.

On the other hand, in step S708, the system control unit 201 performs second recording processing since the flag is OFF. In the second recording processing, out-camera image data is held in the memory 210, an in-camera performs no shooting. That is, the imaging optical system of the in-camera does not operate, and thus neither shooting nor recording of in-camera image data is performed.

Like the above-described first recording processing and second recording processing, when a predetermined condition is met, out-camera image data and in-camera image data are associated with each other, and when the predetermined condition is not met, only an out-camera is operated to perform shooting. This makes it possible to prevent unnecessary image data from being recorded.

According to the above-described embodiments, it is possible to automatically determine whether to record image data shot by the in-camera according to condition settings and the like upon shooting, and prevent unnecessary image data from being recorded, thereby saving a memory capacity, and shortening the time taken for recording processing.

Although the present invention has been elaborated above based on suitable embodiments thereof, the present invention is by no means limited to these specific embodiments and includes various modifications without departing from the concept of the present invention. The above embodiments are merely illustrative embodiments of the present invention, and may be combined where appropriate.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-244808, filed Nov. 6, 2012, which is hereby incorporated by reference herein in its entirety.

What is claimed is:

1. An image capturing apparatus comprising:
   a first image capturing unit configured to shoot an object side;
   a second image capturing unit configured to shoot a photographer side; and
   a control unit configured to, in a shooting mode, in which both the first image capturing unit and the second image capturing unit shoot, perform first recording processing when a setting meets a predetermined condition upon shooting and perform second recording processing when the setting does not meet the predetermined condition upon shooting,
   wherein the first recording processing corresponds to processing of image data captured by the first image capturing unit and image data captured by the second image capturing unit in association with each other,
   wherein the second recording processing corresponds to processing of image data captured by the first image capturing unit without associating the image data captured by the first image capturing unit with image data captured by the second image capturing unit, processing of image data captured by the first image capturing unit but not image data captured by the second image capturing unit, or controlling to record image data captured by the first image capturing unit and not to perform image capturing by the second image capturing unit, and wherein the predetermined condition is whether a self-timer has been set, and if the self-timer has not been set, the control unit performs the first recording processing.

2. The apparatus according to claim 1, wherein in the second recording processing, the control unit records only the image data captured by the first image capturing unit without recording the image data captured by the second image capturing unit.

3. The apparatus according to claim 1, further comprising a setting unit configured to set an operation mode of the apparatus, wherein the operation mode includes one of a still image recording mode, a moving image recording mode, and a reproduction mode.

4. The apparatus according to claim 1, wherein the predetermined condition is determined before start of image capturing.

5. The apparatus according to claim 1, wherein the predetermined condition relates to a set time of the self-timer, and if the set time of the self-timer is shorter than a predetermined time, the control unit performs the first recording processing.

6. An image capturing apparatus comprising:

a first image capturing unit configured to shoot an object side;

a second image capturing unit configured to shoot a photographer side; and a control unit configured to, in a shooting mode, in which both the first image capturing unit and the second image capturing unit shoot, perform a first recording processing when a setting meets a predetermined condition upon shooting and perform a second recording processing—when the setting does not meet the predetermined condition upon shooting, wherein the first recording processing corresponds to processing of image data captured by the first image capturing unit and image data captured by the second image capturing unit in association with each other, wherein the second recording processing corresponds to processing of image data captured by the first image capturing unit without associating the image data captured by the first image capturing unit with image data captured by the second image capturing unit, processing of image data captured by the first image capturing unit but not image data captured by the second image capturing unit, or controlling to record image data captured by the first image capturing unit and not to perform image capturing by the second image capturing unit, and wherein the predetermined condition is a type of shooting scene, and if the shooting scene is not a night view scene and shooting is performed without using a tripod, the control unit performs the first recording processing.

7. An image capturing apparatus comprising:

a first image capturing unit configured to shoot an object side;

a second image capturing unit configured to shoot a photographer side; and a control unit configured to, in a shooting mode, in which the first image capturing unit and the second image capturing shoot, perform a first recording processing when a setting meets a predetermined condition upon shooting and perform a second recording processing when the setting does not meet the predetermined condition upon shooting, wherein the first recording processing corresponds to processing of image data captured by the first image capturing unit and image data captured by the second image capturing unit in association with each other, wherein the second recording processing corresponds to processing of image data captured by the first image capturing unit without associating the image data captured by the first image capturing unit with image data captured by the second image capturing unit, processing of image data captured by the first image capturing unit but not image data captured by the second image capturing unit, or control to record image data captured by the first image capturing unit and not to perform image capturing by the second image capturing unit, and wherein the predetermined condition is whether viewfinder shooting has been set, and if the viewfinder shooting has been set and contact of an eye with a viewfinder has been detected, the control unit performs the first recording processing.

8. An image capturing apparatus comprising:

a first image capturing unit configured to shoot an object side;

a second image capturing unit configured to shoot a photographer side; and a control unit configured to, in a shooting mode in which the first image capturing unit and the second image capturing shoot, perform a first recording processing when a setting meets a predetermined condition upon shooting and perform a second recording processing when the setting does not meet the predetermined condition upon shooting, wherein the first recording processing corresponds to processing of image data captured by the first image capturing unit and image data captured by the second image capturing unit in association with each other, wherein the second recording processing corresponds to processing of image data captured by the first image capturing unit without associating the image data captured by the first image capturing unit with image data captured by the second image capturing unit, processing of image data captured by the first image capturing unit but not image data captured by the second image capturing unit, or control to record image data captured by the first image capturing unit and not to perform image capturing by the second image capturing unit, and wherein the predetermined condition is whether remote control shooting has been set, and if the remote control shooting has been set, the control unit performs the first recording processing.

9. The apparatus according to claim 1, further comprising an operation unit configured to accept a shooting instruction, wherein in response to acceptance of the shooting instruction, the control unit controls to perform shooting by the first image capturing unit and shooting by the second image capturing unit.

10. A control method of an image capturing apparatus having a first image capturing unit configured to shoot an object side and a second image capturing unit configured to shoot a photographer side, the method comprising:

in a shooting mode, in which both the first image capturing unit and the second image capturing unit shoot, performing first recording processing when a setting meets a predetermined condition upon shooting and performing second recording processing when the setting does not meet the predetermined condition upon shooting, wherein the first recording processing corresponds to processing of image data captured by the first image capturing unit and image data captured by the second image capturing unit, wherein the second recording processing corresponds to processing of image data captured by the first image capturing unit without associating the image data captured by the first image capturing unit with image data captured by the second image capturing unit, processing of image data captured by the first image capturing unit but not image data captured by the second image capturing unit, or controlling to record image data captured by the first image capturing unit and not to perform image capturing by the second image capturing unit, and wherein the predetermined condition is whether a self-timer has been set, and if a set time of the self-timer is shorter than a predetermined time, the first recording processing is performed.

11. A non-transitory computer-readable storage medium storing a program for causing a computer to execute the control method according to claim 10.

12. An image capturing apparatus comprising:

a first image capturing unit configured to shoot an object side;

a second image capturing unit configured to shoot a photographer side; and a control unit configured to, in a shooting mode, in which both the first image capturing unit and the second image capturing unit shoot, perform a first recording processing when a setting meets a predetermined condition upon shooting and perform a second recording processing when the setting does not meet the predetermined condition upon shooting, wherein the first recording processing corresponds to processing of image data captured by the first image capturing unit and image data captured by the second image capturing unit, and the second recording processing corresponds to processing of image data captured by the first image capturing unit but not image data captured by the second image capturing unit, and wherein the predetermined condition is whether a self-timer has been set, and if the self-timer has not been set, the control unit performs the first recording processing.

* * * * *